United States Patent [19]

Kitamura

[11] Patent Number: 5,076,990

[45] Date of Patent: Dec. 31, 1991

[54] METHOD FOR RECORDING AND ERASING A VISIBLE IMAGE ON A CARD

[75] Inventor: Masami Kitamura, Nagahama, Japan

[73] Assignee: Mitsubishi Plastics Industries Limited, Tokyo, Japan

[21] Appl. No.: 442,539

[22] Filed: Nov. 28, 1989

[30] Foreign Application Priority Data

| | | | |
|---|---|---|---|
| Nov. 30, 1988 | [JP] | Japan | 63-302802 |
| Feb. 9, 1989 | [JP] | Japan | 1-30864 |
| Jun. 14, 1989 | [JP] | Japan | 1-151411 |

[51] Int. Cl.[5] .......... B29C 71/02; G03G 16/00

[52] U.S. Cl. .......... 264/345; 430/50

[58] Field of Search .......... 264/284, 293, 345, 322; 430/50; 101/170, 487; 346/77 E

[56] References Cited

U.S. PATENT DOCUMENTS

| | | | |
|---|---|---|---|
| 3,118,785 | 1/1964 | Anderson et al. | 264/345 X |
| 3,131,019 | 4/1964 | D'Antonio | 346/77 E |
| 3,196,008 | 7/1965 | Mihajlov et al. | 430/50 |
| 3,196,011 | 7/1965 | Gunther et al. | 430/50 X |
| 3,982,936 | 9/1976 | Goffe | 430/50 X |

FOREIGN PATENT DOCUMENTS

| | | |
|---|---|---|
| 344789 | 12/1989 | European Pat. Off. . |
| 2701176 | 12/1977 | Fed. Rep. of Germany . |
| 57-58309 | 12/1982 | Japan . |
| 1510964 | 5/1978 | United Kingdom . |
| 2176746 | 1/1987 | United Kingdom . |

OTHER PUBLICATIONS

IBM Technical Disclosure Bulletin, vol. 8, No. 11, Apr. 11, 1966, p. 14.

Abstract of Japan 63-47,733 (published Feb. 29, 1988).

Abstract of Japan 2-103,196 (published Apr. 16, 1990).

*Primary Examiner*—Leo B. Tentoni

*Attorney, Agent, or Firm*—Oblon, Spivak, McClelland, Maier & Neustadt

[57] ABSTRACT

A method for recording and erasing a visible image on a card having a recording area with a smooth surface of a synthetic resin, which includes a step of subjecting the smooth surface in the recording area to frosting treatment at a temperature within a range of from the glass transition temperature to the melting point of the synthetic resin, to form a frosted surface having a strain, and step of defrosting the frosted surface by heating it at a temperature higher than the temperature for the frosting treatment, to return it to a smooth surface, whereby a visible image is formed in the recording area by the contrast between the frosted surface and the smooth surface.

6 Claims, 3 Drawing Sheets

METHOD FOR RECORDING AND ERASING A VISIBLE IMAGE ON A CARD

BACKGROUND OF THE INVENTION

The present invention relates to a method for recording and erasing visible images on cards for repeated use, such as commutation passes, admission cards or pre-paid cards. Commutation passes for transportation systems or admission cards for convention halls or buildings are repeatedly used every day. However, there is no effective means to check abuse thereof for illegal rides or unauthorized entrance. In recent years, a checking method by magnetic cards has been employed in some fields. However, the magnetic checking is not visible, and default in checking is likely to occur due to a trouble of the apparatus. Therefore, such magnetic cards have been inconvenient to both users and administrators.

Magnetic cards and IC cards are used also as various pre-paid papers. Again, the recorded information is not visible, and the amounts used or the remaining amounts can not easily be checked. Therefore, there has been a problems in respect of the guarantee in the content to the users.

SUMMARY OF THE INVENTION

It is an object of the present invention to provide a method for recording and erasing a visible image on a card to be repeatedly used such as a commutation card, an admission card or a pre-paid card of various types.

The present invention provides a method for recording and erasing a visible image on a card having a recording area with a smooth surface of a synthetic resin, which comprises a step of subjecting the smooth surface in the recording area to frosting treatment at a temperature within a range of from the glass transition temperature to the melting point of the synthetic resin, to form a frosted surface having a strain, and a step of defrosting the frosted surface by heating it at a temperature higher than the temperature for the frosting treatment, to return it to a smooth surface, whereby a visible image is formed in the recording area by the contrast, i.e. the difference in the light reflectance, between the frosted surface and the smooth surface.

DETAILED DESCRIPTION OF THE INVENTION

Now, the present invention will be described in detail with reference to the drawings of the present invention.

Firstly, referring to FIG. 1, the first embodiment of the method of the present invention will be described with respect to an admission card for checking entrance and exit. A card C has a smooth surface 1 of a synthetic resin on at least a part of its surface. At the entrance, a predetermined frosted image 2 of e.g. a letter or a symbol is formed on this smooth surface 1. This frosted image 2 is formed at a temperature within a range of from the glass transition temperature to the melting point of the resin of the smooth surface 1, whereby it has an internal strain. Accordingly, it has such a nature that when heated, the frosted surface disappears and returns to the initial smooth surface.

With the checked card, the frosted image 2 is formed in the smooth surface 1, whereby it is possible by visual observation to readily determine whether the card was checked or not.

At the exit, this card C is heated at a temperature higher than the temperature for the frosting treatment, whereupon the strain maintained in the frosted image 2 is released, and the frosted image 2 is defrosted or erased and returns to the initial smooth surface. This frosting and defrosting is reversible, and the card can therefore be repeatedly used.

Now, the present invention will be described in further detail step by step.

Figure 2:
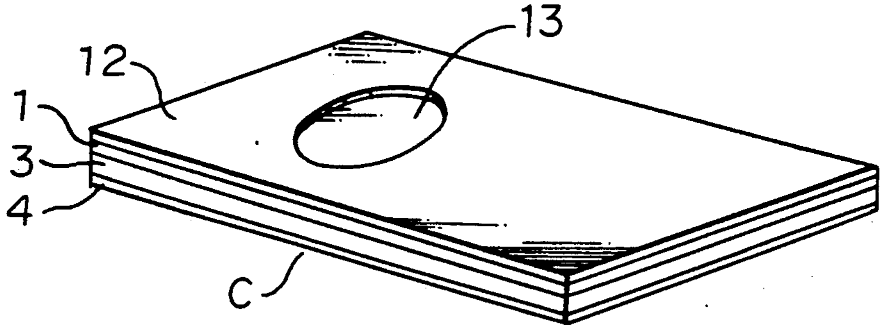
FIG. 2 is a perspective view of an example of the card used for the method of the present invention.

With the card C to be used in the method of the present invention, the surface layer 1 made of a synthetic resin having a smooth surface is exposed on the card surface to constitute a recording area 13, as shown in FIG. 2.

On the card surface other than the recording area 13, a necessary description or a decorative design is printed as shown by printing 12.

On the rear side of the smooth surface layer 1, a base material 3 having a high strength, such as a polyethyleneterephthalate sheet or a paper, is laminated. Further, on its surface, a magnetic recording layer 4 is provided so that various information can be recorded.

As the synthetic resin constituting the smooth surface layer 1, various thermoplastic resins including polyethylene, polypropylene, polyvinyl chloride, polystyrene, polymethyl (meth)acrylate, polyethyleneterephthalate, polyamide, polycarbonate, polyacetal, ABS resin and copolymer resins thereof, may be employed alone or in combination as a mixture. Among them, non-crystalline resins such as polyvinyl chloride, polystyrene, polymethyl (meth)acrylate, and polycarbonate, are preferred since they are easy to treat.

Further, it is possible to employ a resin obtained by cross linking a cross linkable acrylate resin, a cross linkable urethane resin or one of the above-mentioned various resins by a cross linking agent, an electron beam, a $\gamma$-ray and heat cross linking to such an extent that sufficient heat flowability remains.

The thickness of the smooth surface layer 1 is at least 3 $\mu$m to form a frosted image and is usually within a range of from 10 $\mu$m to 3 mm. The overall thickness of the card C is not particularly limited, but is usually from 0.1 to 3 mm. This smooth surface layer 1 may be a film or sheet formed by extrusion molding, or may be formed by coating.

Now, the method of recording a visible image on the card will be described. Frosting treatment is applied partially to the smooth surface layer 1 of the card C to form a frost image 2 of e.g. a letter, a drawing or a symbol due to irregular reflection of light beams on the frosted surface.

Figure 3:
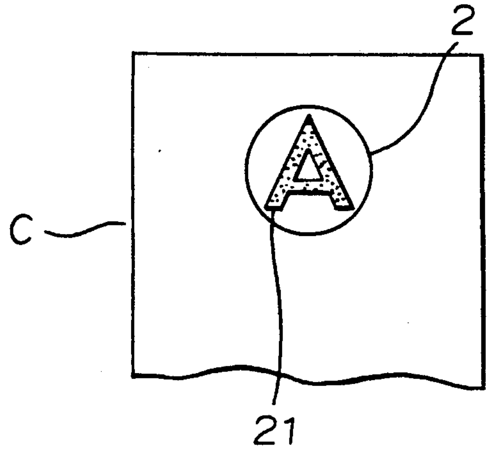
FIGS. 3(*a*) and 3(*b*) are partial plan views of cards on which frost images were formed.
Figure 3:
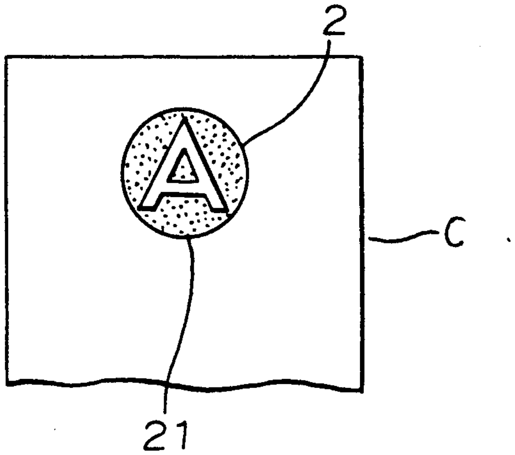

Namely, as shown in FIG. 3(*a*), an image of a letter or the like is formed by the frosted surface 21. Otherwise, as shown in FIG. 3(*b*), the background is constituted by the frosted surface 21, and the image of a letter or the like is constituted by a smooth surface. This frosting treatment is conducted at a temperature within a range of from the glass transition temperature (Tg) to the melting point (Tm) of the synthetic resin constituting the smooth surface layer 1, to provide a strain. At a temperature lower than Tg, no strain will be formed by frosting treatment, or a formed strain will immediately be released even without heating.

At a temperature higher than Tm, frosting can be conducted, but the formed frost will not retain a strain, and the frost can not be erased even by reheating, whereby the object of the present invention can not be attained.

Non-crystalline resins do not show distinct Tm in many cases. In such cases, the flow temperature may be taken as the melting point. Likewise, in the case of a cross linked resin which usually does not show Tm, frosting treatment may be conducted at a temperature of not higher than the flow temperature (or the decomposition-initiation temperature). Further, in the case of a resin mixture or a copolymer resin showing two or more Tg, the higher Tg may be used as the glass transition temperature for the purpose of the present invention.

The frosted image 2 thus formed, disappears when heated at a temperature higher than the frosting treatment. Therefore, the frosting treatment is preferably conducted at a temperature of at least 60° C. within the above-mentioned range from the viewpoint of the stability of the image.

As an example for a method of frosting treatment, a method may be mentioned in which a stamp with a frosted surface is pressed against the smooth surface layer 1. In this case, the stamp may be heated, or the smooth surface layer 1 may be heated.

With respect to the frosted condition, the surface roughness of the frosted surface 21 of the frosted image 2 is within a range of from 1 to 10 $\mu m$ as a 10 point average roughness (Rz) in accordance with JIS B-0601. If the surface roughness is less than 1 $\mu m$, the difference between the frosted image and the smooth surface is small, and it tends to be difficult to determine the presence or absence of the image. On the other hand, if the surface roughness exceeds 10 $\mu m$, it tends to be difficult to completely erase the frost at the time of erasing the visible image, such being troublesome for reuse.

As another method for frosting treatment, a method may be mentioned wherein an impact dot printer having a heating mechanism (an ink ribbon is unnecessary) is used. In this case, the frosted surface condition is complicated and can not easily be defined by the surface roughness. However, a sharp image can be obtained if the dot size is from 256 to 2,304 dots/$mm^2$.

When a dot printer is employed, the frosted image is formed by a set of fine dots. A pressure is exerted at the individual dots, and the deformed surface area is small, whereby no pressing mark to the rear side of the card will be formed.

Further, as compared with the pressing with a stamp, the boundary will be distinct, whereby the image will be sharp, and the resolving power will be large. Furthermore, by using such a dot printer, not only a predetermined image, but also an image of an optional letter or optional size, can be recorded as desired. Further, it is possible that prior to the recording, the image can be displayed and confirmed by a CRT display.

In the case of an admission card or a commutation card, the image 2 may be not only the indication of the entrance, but also the location, the day and the time of the entrance, etc. In the case of a pre-paid card, the amount used and the amount remaining may be recorded.

When the image on the card is to be erased, the frosted image 2 of the card C is heated at a temperature higher than the temperature for the frosting treatment to defrost the frosted image.

The frosted image 2 has a strain as mentioned above. Therefore, when it is heated at a temperature higher than the temperature of imparting the strain, the strain will be released, and the frosted surface 21 will return to the initial smooth surface. The heating may be conducted by blowing a hot air or irradiation of a laser beam.

Such erasing of the recorded image can be conducted at a proper time depending upon the particular use of the card. For example, in the case of a card to be used for the entrance and exit, such as the commutation card, an image may be formed at one of the entrance and the exit and erased at the other. In the case of a pre-paid card to be used for shopping, the amount used and the amount remaining may be recorded at the time of using the card, and erasing and fresh recording may be conducted at the next time of its use.

The card in FIG. 2 is provided with a magnetic recording layer 4 on its rear side.

A magnetic card or an IC card is capable of recording various information such as a specification for its use and permits easy calculation by an apparatus. Therefore, by applying the method of the present invention to such a card, it is possible to utilize such functions and to display the main items of the recorded information in a visually observable form. For example, the amount used and the amount remaining may be displayed in the form of a visual image each time when a pre-paid card is used.

A magnetic recording layer 4 may be provided at an appropriate position, e.g. inside of the card as an inner layer, depending upon the apparatus to be used.

Now, referring to FIGS. 4 to 7, the structures of cards to be used for the method of the present invention will be described. The card shown in FIGS. 4 and 5 comprises a smooth surface layer 1 and a base material 3 provided with an window 31 bonded on each side the smooth surface layer 1, wherein the smooth surface layer 1 is partially exposed to constitute a recording area. The smooth surface layer 1 is transparent when it is not frosted. Necessary explanations or decorative designs may be printed on one or both of the base materials.

With this card, when a frost image is formed at the portion which is transparent from the front side to the rear side of the card, not only the difference in the light reflection between the frosted surface and the smooth surface, but also the difference in the transparency can be utilized to observe the frosted image clearly by see through the card in such a state that a frosted image has been formed.

To enable the frosted image of the card used for the method of the present invention to be seen more readily, it is advisable to color the smooth surface layer 1 with a dark color.

Namely, the frosted image 2 may be made more readily observable when the smooth surface layer is colored to have a lightness (V) of at most 5 as stipulated by JIS Z-8721.

Figure 6:
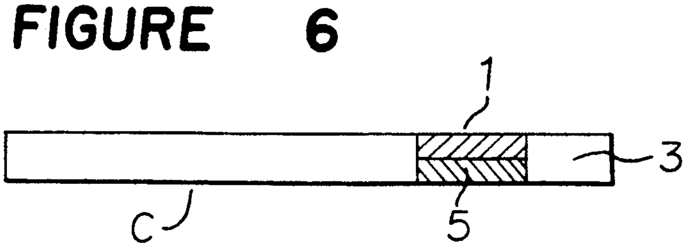
FIGS. 6 and 7 are cross sectional views of different types of cards.

As another method for making the image readily observable, a background layer 5 may be formed beneath the smooth surface layer 1 as in the card shown in FIG. 6. As the background layer 5, the following two are effective.

1) A colored layer having a lightness (V) of at most 5 as stipulated by JIS Z-8721. The material may be paper or a synthetic resin, and is not particularly limited.

2) Metallic specular layer

The metallic specular layer having a 60° specular glossiness of at least 100% as stipulated by JIS Z-8741 is particularly preferred. As the metal, aluminum, nickel, chromium, tin or copper may be employed.

When a background layer 5 is provided, the smooth surface layer 1 is made of a material which is transparent in a non-frosted state. By the provision of such a background layer 5, the frosted image 2 becomes distinctive against the dark background or against the metallic reflective layer, whereby the visual observation of the image will be easy. Particularly effective is the use of a metallic specular layer.

Figure 7:
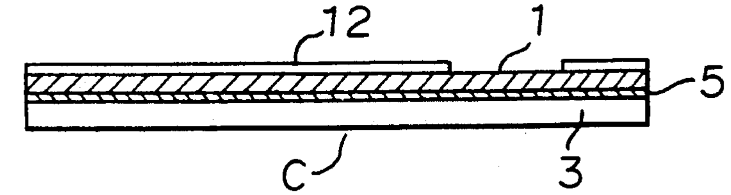

FIG. 7 shows an example of the card having a metallic specular layer formed as a background layer 5 on one side of a base material 3 by vapor deposition of a metal. In this case, it is preferred to apply a printing 12 on its upper surface to present a necessary information and to prevent the vapor deposited metallic layer from being see through from above.

Now, the second embodiment of the present invention will be described with reference to FIGS. 8 to 11. In this second embodiment, the same cards as used in the first embodiment may be employed.

Figure 8:
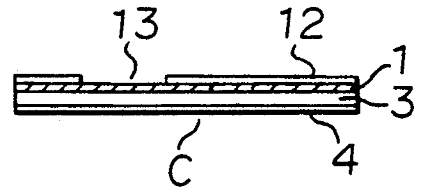
FIGS. 8 to 11 illustrate a second embodiment of the method of the present invention.

FIG. 8 is a cross sectional view of the card shown in FIG. 2, wherein a recording area 13 is formed with a smooth surface layer 1 exposed.

Figure 9:
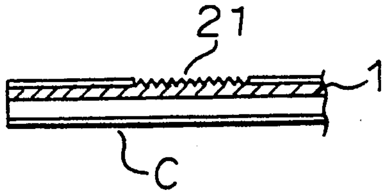
Figure 10:
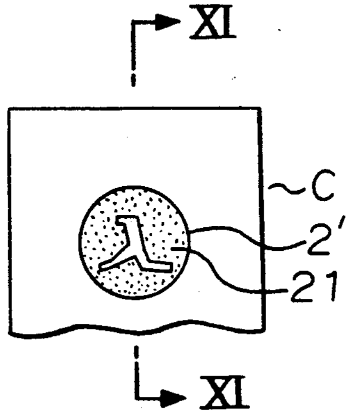
Figure 11:
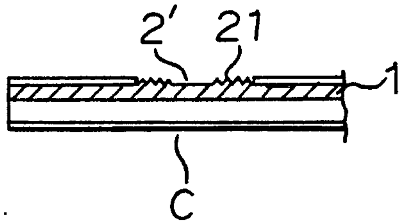

Now, the recording method to the card will be described. Firstly, as shown in FIG. 9, the entire surface of the recording area 13 of the card is subjected to frosting treatment to form a frosted surface 21. This frosting treatment is conducted at a temperature of from the glass transition temperature (Tg) to the melting point (Tm) of the resin constituting the smooth surface layer 11 to provide a strain. For this frosting treatment, a usual method may be employed in which a frosting plate or a frosting roll is employed. As mentioned above, the frosted state is preferably such that the surface roughness of the frosted surface 21 is within a range of from 1 to 10 $\mu$m by a 10 point average roughness in accordance with JIS B-0601. When this card is used as an admission card, the recording area 13 of the frosted card 1 is partially heated to a temperature higher than the temperature for the frosting treatment to defrost the portion and to form a smooth surface image 2' as shown in FIGS. 10 and 11.

The frosted surface 21 has a strain as mentioned above, and when heated at a temperature higher than the temperature for imparting the strain, the strain will be released, and only the heated portion of the frosted surface 21 returns to a smooth surface, whereby the image 2' of e.g. a letter, a symbol or a design appears due to the difference in the reflectance between the frosted surface and the smooth surface.

The heating may be conducted by pressing or approaching a heated stamp to the frosted surface 21. However, it is usually preferred to employ a thermal head which is commonly employed for a thermal printer. Here, the thermal head is a head where fine heating elements are gathered together in the form of a matrix so that only necessary points will be heated by signals from outside. By means of a such a thermal head, an image is formed by gathering a number of dots, whereby the boundary will be distinct, the image will be sharp, and the resolving power will be large.

Further, by means of such a thermal head, it is possible to record not only a predetermined image, but also an image of an optional letter or size, as the case requires. Furthermore, recording can be conducted after displaying an image on e.g. a CRT display and confirming it.

The size of the fine dots constituting an image may suitably be selected depending upon the size of the image. However, from the viewpoint of the sharpness of letters, the size is preferably within a range of from 35 to 2,304 dots/mm$^2$.

The recorded image 2' may include in addition to the indication of entrance, but also the location, the day and the time of the entrance.

At the exit, the entire surface of the recording area 13 is subjected to frosting treatment to erase the image 2'. This frosting treatment may be the same as the first frosting treatment and conducted at a temperature within a range of from Tg to Tm of the synthetic resin to provide a strain in the synthetic resin. Thus, the card is returned to the condition prior to the formation of the image (FIG. 9) and can thereafter be repeatedly used.

This erasing of a recorded image can be conducted at a suitable time depending upon the particular purpose of the card. For example, the erasing may be conducted immediately prior to conducting a new recording for the use of the card for the next time.

Figure 12:
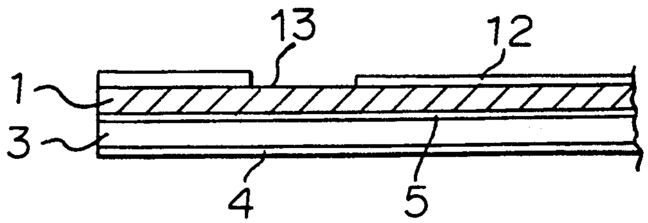
FIG. 12 illustrates another example of the card used for the method of the present invention in which a metallic specular layer is provided.

FIG. 12 shows another example of the card, in which a metallic specular layer (reflective layer) 5 is provided. The reflective layer 5 may not necessarily be immediately beneath the smooth surface layer 1 and may be provided beneath a base material 3 if the base material 3 is transparent (i.e. smooth surface layer 1/base material 3/reflective layer 5).

Further, a magnetic recording layer 4 may be provided at an appropriate position, e.g. inside the card as an inner layer, so long as it does not impair the functions of the reflective layer 5.

According to the method of the present invention, the checking or non-checking of the entrance or the exit, or the amount used or the amount remaining of a pre-paid card, can easily be visually confirmed by forming a heat-erasable visible frosted image on the card, whereby an omission of recording due to a trouble of an apparatus, or an error in recording can immediately be detected. Therefore, the method is convenient not only to the administrators, but also to the users of the cards and gives the users a feeling of assuredness.

Further, the card can be used repeatedly with the same performance for recording-erasing-rerecording and has high reliability.

Now, the present invention will be described with reference to Examples. However, it should be understood that the present invention is by no means restricted by such specific Examples.

EXAMPLE 1

Figure 1:
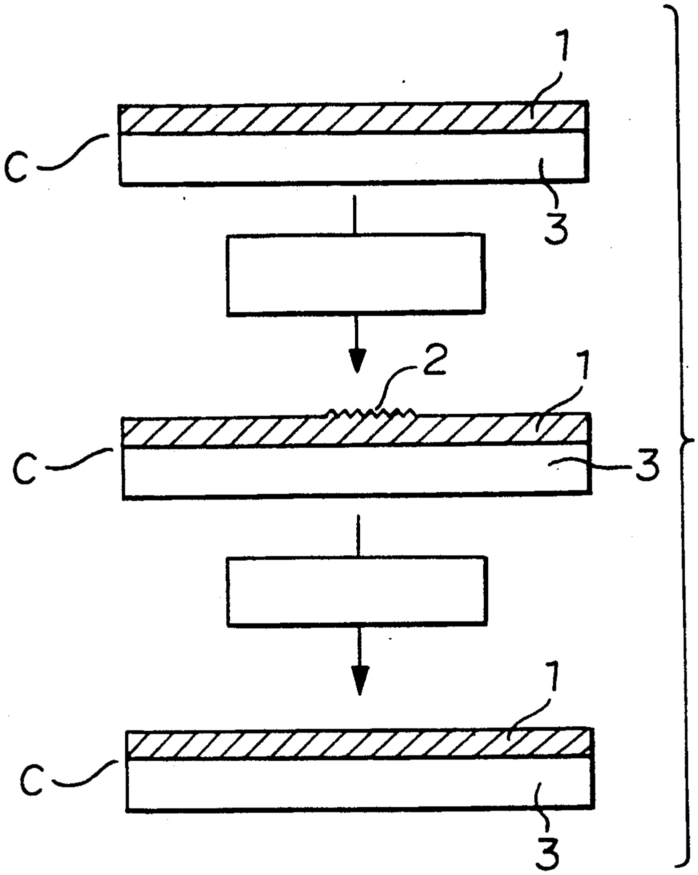
FIG. 1 is a diagrammatic illustration of a first embodiment of the method of the present invention.

Referring to the card of the structure shown in FIG. 1, a card was prepared by using a colorless transparent polyvinyl chloride resin (PVC) sheet (thickness: 100 μm, Tg: 70° C., Tm: 202° C.) as the smooth surface layer 1 and paper (thickness: 200 μm) as the base material 3.

Then, by a stamp having a diameter of 10 mm, a frost image 2 as shown in FIG. 3(*a*) was formed on the smooth surface layer 1 under the following conditions.

10 Point average roughness (Rz) of the frosted surface of the stamp: 20 pm
Temperature of the stamp: 80° C.
The stamping condition: 40 kg/cm$^2$, 0.5 second By this operation, a frosted image 2 having Rz 8 μm was formed on the smooth surface layer. This image did not disappear even after expiration of one month.

Hot air of 120° C. was blown to this card for 2 seconds, whereby the frosted image disappeared completely.

This cycle of frosted image formation-erasing was repeated 1,000 times, whereupon the same performance was obtained.

EXAMPLE 2

Instead of the PVC sheet in Example 1, a PVC sheet colored green with a lightness (V) of 2 was used, whereby the frosted image was more distinctly observed than in Example 1.

EXAMPLE 3

Figure 4:
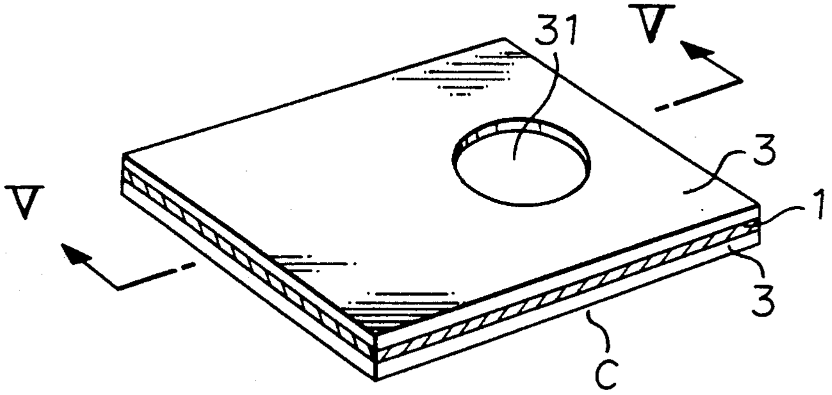
FIG. 4 is a perspective view of an example of the card used for the method of the present invention.
Figure 5:
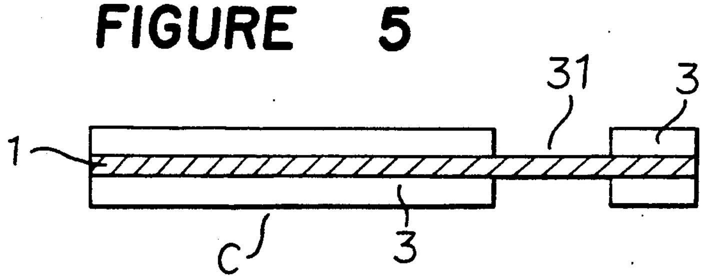
FIG. 5 is a cross sectional view along line V—V in FIG. 4.

A card having the structure shown in FIGS. 4 and 5 was prepared by using a colorless transparent polystyrene sheet (thickness: 100 μm, Tg: 100° C., Tm: 240° C.) and laminating a paper base sheet 3 having a window 31 punched out, on each side of the sheet.

Then, a frosted image shown in FIG. 3(*b*) was formed under the following conditions by a stamp having a diameter of 10 mm.

Rz of the frosted surface of the stamp: 10 μm
Temperature of the stamp: 130° C.
Stamping condition: 40 kg/cm$^2$, 0.5 second By the above operation, a frosted image having Rz of 3 μm was formed on the smooth surface layer. This image was slightly difficult to see as observed as it is. But when observed through a light, a very distinctive clear image was visually observed.

Hot air of 150° C. was blown to this card for 2 seconds, whereupon the frosted image disappeared completely. Further, this cycle of frosted image forming-erasing was repeated 1,000 times, whereby the same performance was obtained.

EXAMPLE 4

A card having the structure shown in FIG. 1 was prepared by bonding a colorless transparent PVC sheet (thickness: 50 μm, Tg: 70° C., Tm: 102° C.) and a PVC sheet colored black with a lightness of 2 (thickness: 2 mm).

A frosted image was formed on this card in the same manner as in Example 1, whereby a clear image more readily observable than in Example 1 was obtained with the black PVC sheet constituting the background.

EXAMPLE 5

A part of a paper base material was punched out, and to that punched out portion, a transparent polystyrene sheet (thickness: 100 μm, Tg: 100° C., Tm: 240° C.) as the smooth surface layer 1 and a tin-plate sheet having Rz of 0.01 μm (thickness: 100 μm) as the metallic specular background layer 5 were fit in to obtain a card as shown in FIG. 6. The specular glossiness of the back ground layers was 130%.

Then, a frosted image was formed under the same conditions as in Example 3, whereby the image was clearly visually observed.

EXAMPLE 6

Aluminum was vapor deposited on one side of a PET sheet 3 (thickness: 50 μm) to obtain Rz of 0.1 μm, and a colorless transparent PVC film 1 (thickness: 30 μm, Tg: 70° C., Tm: 202° C.) was bonded on the vapor deposited surface. Then, a white color printing 12 was applied on the upper surface of the PVC film to obtain a card having the structure shown in FIG. 7. The specular glossiness of the aluminum deposited surface was 180%.

Then, a frosted image was formed under the same conditions as in Example 1, whereby an image far clearer than in Example 1 was obtained.

EXAMPLE 7

By using the same card as used in Example 6, recording was conducted by means of an impact dot printer.

Firstly, an indication of "entrance" was displayed on a CRT display, and it was recorded on the card by a dot printer (without an ink ribbon, heated at 80° C.) with 24 dots (size of letters: 5 mm each side). The frosted image thus obtained had a clear outline and was easy to visually observe.

EXAMPLE 8

(A) Referring to the card C having the structure shown in FIG. 2, a card was prepared by using a black colored polyvinyl chloride resin sheet (thickness: 30 μm, Tg: 70° C., Tm: 202° C.) as the smooth surface layer 1 and a polyethyleneterephthalate sheet (thickness: 150 μm) as the base material 3 and applying a white printing 12 on the black sheet except for the recording area 13.

(B) Then, frosting treatment was conducted by pressing the recording area 13 by a frosting hot plate under the following conditions:

Rz of the frosted surface of the hot plate: 15 μm
Temperature of the hot plate: 80° C.
Pressing condition: 20 kg/cm$^2$, 0.5 second By the above operation, a frosted surface 21 having a Rz of 8 μm was formed in the recording area 13.

(C) Then, an indication of "entrance" was displayed on a CRT display, and it was printed on the recording area by permitting a thermal head printer (120° C.) with 24 dots (size of each letter: 5 mm in each side) to run on the recording area, to obtain a clear smooth surface image.

(D) Then, the recording area 13 was subjected to frosting treatment under the same condition as in step (B), whereby the image disappeared completely.

Further, the treatment of the above steps (C) to (D) was repeated 1,000 times, whereby the same performance was obtained.

EXAMPLE 9

A card having the structure shown in FIG. 12 was prepared. By using a white polyethyleneterephthalate sheet (thickness: 150 μm) as the base material 3, a magnetic layer 4 was formed on one side and on the other side, a reflective layer 5 (vapor deposited aluminum layer having a thickness of 0.05 μm) and a smooth surface layer 1 (a colorless transparent polyvinyl chloride resin layer having a thickness of 10 μm, Tg: 70° C., Tm: 202° C.) were sequentially laminated, and a white printing 12 was applied except for the recording area, to obtain a card. The specular glossiness of the reflective layer 5 was 180%.

The recording and erasing were conducted in the following manner.

(A) Firstly, a frosting plate having Rz of 15 μm heated to 80° C., was pressed against the recording area under a pressure of 20 $kg/cm^2$ for 0.5 second to form a frosted surface having Rz of 8 μm.

(B) Then, an indication of "entrance" was printed in the recording area by permitting a thermal head (heated to 120° C.) with 24 dots (size of each letter: 5 mm in each side) to run on the recording area, based on the signals for "entrance" preliminarily recorded on the magnetic layer 4.

(C) Then, the recording area was subjected to frosting treatment in the same manner as in step (A), whereby the image disappeared.

The above cycle of image forming erasing was repeated 1,000 times, whereby the same performance was obtained.

Further, the sharpness of the image on the card was very high as compared with the case where the reflective layer 5 was not provided.

I claim:

1. A method for recording and erasing a visible image characterized by contrast between a frosted surface and a smooth surface on a data carrier card having a recording area with a smooth surface of a synthetic resin having a glass transition temperature and a melting point at a higher temperature, which comprises preliminarily pressing the entire recording area with an applied frosting surface pressure plate or roll at a temperature within a range of from the glass transition temperature to the melting point of the synthetic resin to form a frosted surface having a strain over the entire recording area; for recording, heating a localized part of the surface frosted recording area at a temperature higher than the temperature employed for the applied frosting surface pressure treatment to form a defrosted image; and, for erasing, pressing the recording area with an applied frosting pressure plate or roll at a temperature within a range of from the glass transition temperature to the melting point of said synthetic resin to frost and erase the defrosted image.

2. The method according to claim 1, wherein a metallic specular layer is disposed beneath the synthetic resin to enhance the contrast between the defrosted image and the frosted surface.

3. The method according to claim 2, wherein the metallic specular layer has a 60° specular glossiness of at least 100% as stipulated by JIS Z-8741.

4. The method of claim 1 wherein the synthetic resin glass transition temperature is at least 70° C.

5. The method of claim 1 wherein the synthetic resin is polyvinyl chloride.

6. The method of claim 1, wherein the synthetic resin is polystyrene.

* * * * *